(12) United States Patent
Yachida et al.

(10) Patent No.: US 9,251,738 B2
(45) Date of Patent: Feb. 2, 2016

(54) DISPLAY DEVICE AND CONTROL METHOD FOR SAME

(71) Applicant: NIPPON SEIKI CO., LTD., Niigata (JP)

(72) Inventors: Takeshi Yachida, Niigata (JP); Yuuki Masuya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/398,949

(22) PCT Filed: Apr. 5, 2013

(86) PCT No.: PCT/JP2013/060438
§ 371 (c)(1),
(2) Date: Nov. 4, 2014

(87) PCT Pub. No.: WO2013/168496
PCT Pub. Date: Nov. 14, 2013

(65) Prior Publication Data
US 2015/0116192 A1    Apr. 30, 2015

(30) Foreign Application Priority Data

May 11, 2012    (JP) .................................. 2012-109406

(51) Int. Cl.
*G09G 1/00*    (2006.01)
*G09G 3/34*    (2006.01)
*H05B 33/08*   (2006.01)

(52) U.S. Cl.
CPC .......... *G09G 3/3406* (2013.01); *H05B 33/0854* (2013.01); *G09G 2300/08* (2013.01)

(58) Field of Classification Search
CPC ... G09G 1/00; G09G 2360/16; G09G 3/3406; H04N 9/045
See application file for complete search history.

(56) References Cited

U.S. PATENT DOCUMENTS

2013/0093803 A1*  4/2013  Saitoh .................. G09G 3/3611
                                                    345/690

FOREIGN PATENT DOCUMENTS

| JP | 61-42333 U      | 3/1986  |
| JP | 2004-2999506 A  | 10/2004 |
| JP | 2004-351943 A   | 12/2004 |
| JP | 2006-285064 A   | 10/2006 |
| JP | 2010-54727 A    | 3/2010  |

OTHER PUBLICATIONS

International Search Report issued in Application No. PCT/JP2013/060438 dated May 28, 2013.

* cited by examiner

*Primary Examiner* — Michael Faragalla
(74) *Attorney, Agent, or Firm* — McDermott Will & Emery LLP (57) ABSTRACT

A display device compresses light-emitting display of modifiable display luminance; a light sensor for detecting the surrounding brightness; and a control for adjusting the display brightness of the light-emitting display in response to a brightness value based on detected results of the brightness sensor. If absolute value of the difference between current and previously determined brightness values is less than a prescribed threshold value, the control determines that there is no change in brightness otherwise the central determines that there has been a change in brightness. Upon a determination of a predetermined number of times that a brightness change has occurred, the display luminance is adjusted in response to the current brightness value.

6 Claims, 4 Drawing Sheets

DISPLAY DEVICE AND CONTROL METHOD FOR SAME

CROSS-REFERENCE TO RELATED APPLICATIONS

The present application is the U.S. National Phase of PCT/JP2013/060438 filed Ap. 5, 2013, which claims priority to Japanese Patent Application No. 2012-109406 filed May 11, 2012. The disclosures of the above applications are incorporated herein by reference.

TECHNICAL FIELD

The present invention relates to a display device capable of adjusting display brightness of a light-emitting display in accordance with ambient luminance, and a control method for the same.

BACKGROUND ART

There has been known a display device that automatically adjusts brightness of a light-emitting display such as a fluorescent display tube in accordance with ambient luminance. For example, as a head-up display installed in a vehicle, there is such a device that detects a luminance in front of a vehicle that becomes a background of a display image projected on a windshield of a vehicle, with a light sensor, controls the brightness of a display image projected on a windshield in accordance with the detected luminance in front of a vehicle, increases the display brightness when the luminance increases (brighten) and decreases the display brightness when the luminance is lowered (darken), and adjusts the display brightness to be optimized for the ambient luminance (see Patent Literature 1, for example).

In such an automatic adjustment of a light-emitting display, a temporary and sudden change may occur in a luminance value detected by a light sensor, in cases where external light comes in some places while a vehicle is traveling or a wiper is working. This causes a problem that a change in the display brightness is repeated in a short period of time and a display flicker occurs, in the case of adjusting the display brightness in accordance with a noise component of such a detected luminance value. In contrast to this, the Patent Literature 2 discloses a display device that performs determination of a luminance change, twice or more based on a detected luminance value, and adjusts a display brightness based on the latest luminance detection value, when it is determined that there is a luminance change in a predetermined successive number of times.

CITATION LIST

Patent Literature

Patent Document 1: Japanese Utility Model Application No. 61-42333
Patent Document 2: Japanese Patent Application Publication No. 2004-299506

SUMMARY OF THE INVENTION

Problems to be Solved by the Invention

However, the configuration disclosed in the Patent Literature 2 has a problem that although a flicker can be reduced for a temporary and sudden change in a detected luminance value, even a small change is judged as a change in luminance, and a flicker cannot be prevented when a small change continues in a detected luminance value. For this problem, there is a measure to solve the problem by increasing the number of determinations of luminance change. However, this cases, another problem that responsiveness to brightness adjustments is deteriorated. A flicker is difficult to be recognized by a user in the daytime with a high ambient luminance even if the display brightness is changed in accordance with a small flicker in a detected luminance value, but is easily recognized in twilight or at sunrise with a low ambient luminance because of a high contrast between a display image and a background.

The present invention has been made in view of the above problems. It is an object of the invention to provide a display device capable of decreasing a display flicker due to a change in display brightness without reducing responsiveness to adjustment of display brightness.

Means for Solving the Problem

The present invention comprises the following features for solving the problems. A display device comprising a light-emitting display capable of changing display brightness, a luminance detection means that detects ambient luminance, and a control means that controls the display brightness of the light-emitting display in accordance with a luminance value calculated based on the detection result of the luminance detection means, wherein: the control means is configured to: determine that there is no luminance change when an absolute value of a difference between a luminance value of this time and a luminance value in the last determination is less than a predetermined threshold value, determine that there is a luminance change when an absolute value of a difference between the luminance value of this time and the luminance value in the last determination is equal to or greater than the predetermined threshold value, and adjust the display brightness of the light-emitting display in accordance with the luminance value of this time, when it is determined that there is a luminance change successively in a predetermined first number of times.

Further, the control means adjusts the display brightness of the light-emitting display in accordance with the luminance value of this time, when it is determined that there is no luminance change successively in a second number of times more than the predetermined first number of times.

Furthermore, the control means is configured to: calculate the luminance value in a cycle shorter than a cycle to determine a luminance change, determine whether a state of the determination result of a luminance change is no luminance change, luminance increase, or luminance decrease, and adjust the display brightness of the light-emitting display in accordance with the luminance value of this time, only when the state of the change in the luminance value coincides with the state of the determination result of the luminance change, while it is being determined that there is a luminance change successively in the first number of times.

The present invention comprises the following features for solving the problems. A control method for a display device, that comprises a light-emitting display capable of changing display brightness, and a luminance detection means that detects ambient luminance, and controls display brightness of the light-emitting display in accordance with a luminance value calculated based on the detection result of the luminance detection means, the method comprising: determining that there is no luminance change when an absolute value of a difference between a luminance value of this time and a luminance value in the last determination is less than a predetermined threshold value, determining that there is a luminance change when an absolute value of a difference between the luminance value of this time and the luminance value in the last determination is equal to or greater than the predetermined threshold value, and adjusting the display brightness of the light-emitting display in accordance with the luminance value of this time, when it is determined that there is a luminance change successively in a first number of times.

Further, he control method comprising adjusting the display brightness of the light-emitting display in accordance with the luminance value of this time, when it is determined that there is no luminance change successively in a second number of times more than the first number of times.

Furthermore, the control method comprising calculating the luminance value in a cycle shorter than a cycle to determine a luminance change, determining whether a state of the determination result of luminance change is no luminance change, luminance increase, or luminance decrease, and adjusting the display brightness of the light-emitting display in accordance with the luminance value of this time, only when the state of the change in the luminance value coincides with the state of the determination result of the luminance change, while it is being determined that there is a luminance change successively in the first number of times.

Effect of the Invention

According to the present invention, it is possible to reduce a display flicker due to a change in display brightness without reducing responsiveness to adjustment of display brightness.

MODES FOR CARRYING OUT THE INVENTION

Hereinafter, an embodiment of applying the present invention to a head-up display (HUD) for a vehicle will be described with reference to the drawings.

First, a basic configuration of a HUD device 1 will be explained with reference to FIG. 1. The HUD device 1 comprises a case body 10, a display (a light-emitting display) 20, a circuit board 30, a reflection member 40, a combiner 50, a light guide body 60 formed integrally with the combiner 50, a light sensor (a luminance detection means) 70.

The HUD device 1 is configured as a stationary HUD device to be mounted on a dashboard of a vehicle (for example, above an instrument panel). In the following description, the components of the HUD device 1 will be explained on the assumption that the upward direction viewed from a viewer 2 that views the display image by displays of the HUD device 1, is "Upper", the downward direction is "Lower", the front direction is "Front", the rear direction is "Rear" (see the double-headed arrow in FIG. 1).

The case body 10 is a box-shaped member made of light-shielding resin material or the like, that houses the display 20, the circuit board 30, the reflection member 40 and the light sensor 70, and holds the combiner 50. The upper part of the case body 10 is provided with a first opening 11 that passes a display light L emitted from the display 20. On the front side than the first opening 11, a mounting part (not shown) that is a part to mount the combiner 50 is provided. The lower end part of the combiner 50 is attached to the mounting part with a screw or the like. In such a manner, the case body 10 holds the combiner 50. The combiner 50 is held so as to extend upward from the case body 10. The case body 10 is provided a second opening 12 that exposes the light guide body 60 upward, and passes an incident light (an external light N described later) through the inside of the case body 10.

The display 20 is a light-emitting display that emits a display light L representing a display image, including display information such as a vehicle speed, an engine speed, a shift position, a travel distance, a remaining fuel amount, time, fuel efficiency, an outside temperature, and the like. For example, the display comprises a light-emitting (LED) display consisting of LEDs arranged in a matrix, a transmissive crystal liquid display composed of a liquid crystal panel and a backlight source, or an organic EL display. The display 20 is able to adjust brightness (display brightness) of the display light L in accordance with the luminance of the external light N by a dimming control described later.

The circuit board 30 is a printed circuit board that a light sensor 70, a control means 80 described later (not shown in FIG. 1), and the likes are mounted on the surface of a plate-shaped substrate made of resin or the like containing a glass fiber, and the components are wired. The circuit board 30 is fixed on the front side than the display 20 inside the case body 10 by a not-shown fixing member. The circuit board 30 and the display 20 are conductively connected via a flexible printed circuit (FPC). One end of the FPC 3 is connected to the circuit board 30 via a connector C.

The reflection member 40 is composed of an aluminum deposited plate-shaped resin mold, for example, and is located on the display side of the display 20, that is, on the emission side of the display light L, to reflect the reached display light L toward the combiner 50. The reflection member 40 has a reflection surface configured as a curved surface for magnifying a display image or correcting a distortion (the reflection surface is shown schematically as a plane in FIG. 1). The reflection member 40 is disposed so that the reflection surface is substantially facing to the display side of the display 20. The display light L reaching the reflection member 40 from the display 20 is reflected by the reflection surface of the reflection member 40, and is directed to the combiner 50 passing through the first opening 11 of the case body 10.

Figure 1:
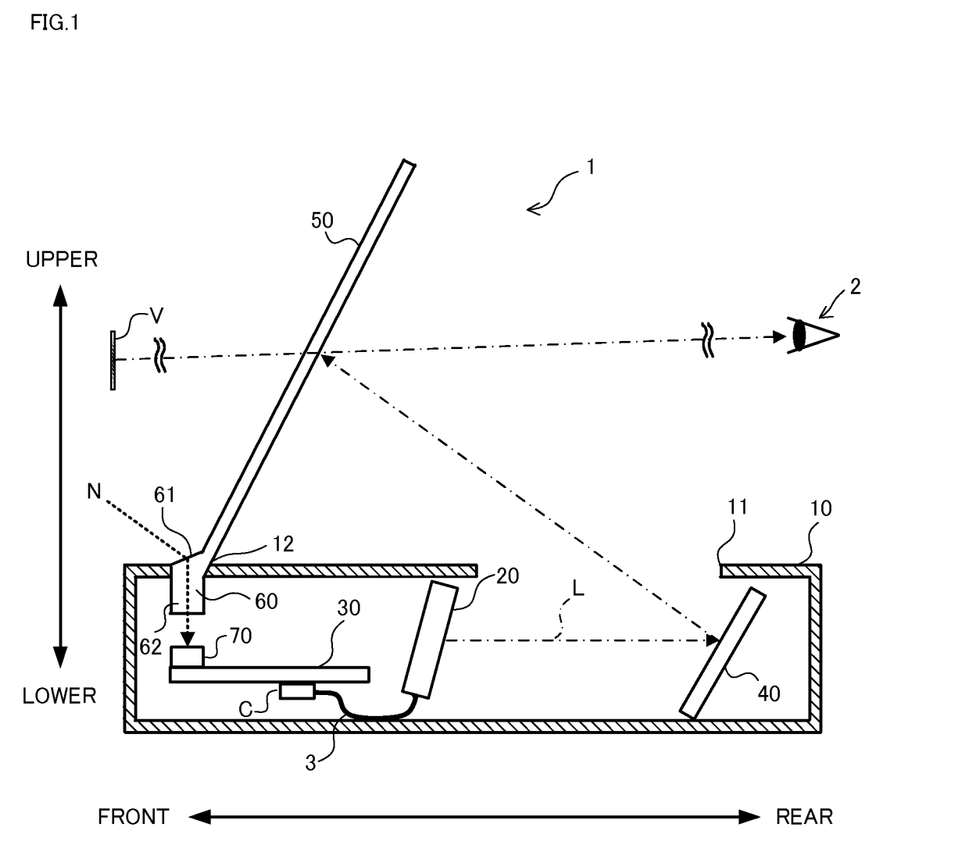
FIG. 1 is a schematic sectional view of a HUD device that is an embodiment of the present invention.

The combiner 50 is composed of a plate-shaped half-mirror having a curved reflection surface, or the like (the combiner 50 is shown schematically as a plane in FIG. 1). As described above, the combiner 50 is attached to the case body 10, and its reflection surface is substantially faced to the reflection surface of the reflection member 40. The combiner 50 reflects a reached display light L toward the viewer 2 by the reflection surface to enter the display light L into the eye of the viewer 2, and causes the viewer 2 to recognize a virtual image V of a display image formed in front of the combiner 50. Thus, the viewer 2 can view both the actual background and the virtual image V being superimposed. A hologram element may be used as the combiner 50. In this case, the display light L reaching the combiner 50 is changed optical path by diffraction.

The light guide body 60 is formed integrally with the combiner 50, for example, projected downward from a part of the lower end of the combiner 50. The light guide body 60 is used to lead an external light N from a predetermined direction (mainly, forward in the embodiment) to the light sensor 70, and comprises of an incident surface 61 that is inclined upward to enter the external light N, and an emission surface 62 that emits the external light N toward the light sensor 70.

The light sensor 70 is used to detect brightness (luminance) of reaching light, and is disposed on the circuit board 30, so as to oppose to the emission surface 62 of the light guide body 60, and so that the optical axis of the light entering the light sensor 70 is along the vertical direction. The light sensor 70 supplies a voltage corresponding to the luminance of the reached light to the control means via an amplifier circuit (not shown).

Figure 2:
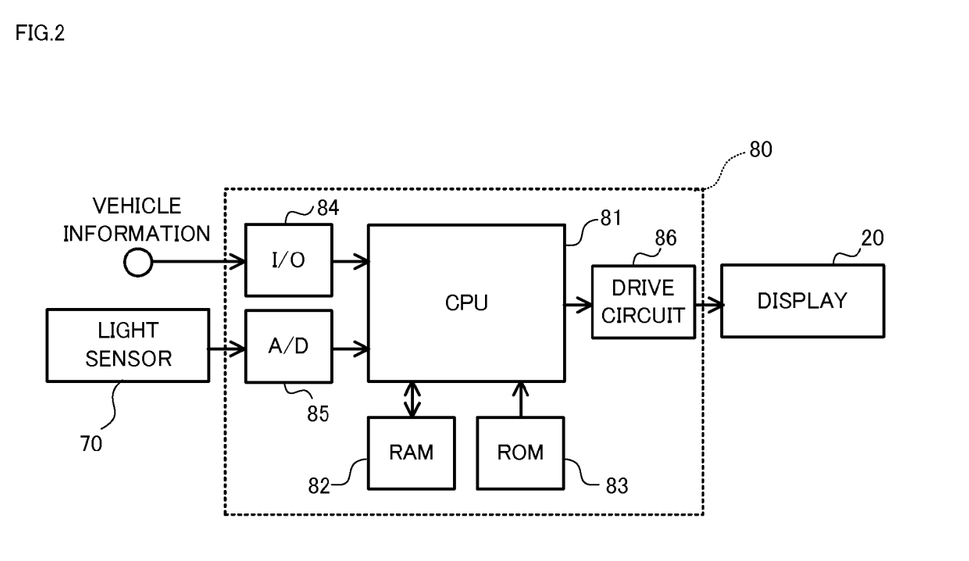
FIG. 2 is a block diagram showing an electrical configuration of the HUD device.

FIG. 2 is a diagram showing an electrical configuration of the HUD device 1. A control means 80 is a circuit that is comprised mainly of a known microcomputer comprising a central processing unit (CPU) 81, a random access memory (RAM) 82, a read only memory (ROM) 83, a data I/O circuit 84, an A/D converter 85, a drive circuit 86, and a bus line or the like to connect them.

The CPU 81 is connected to the components 82 to 86, and used to perform display control and dimming control of the display 20 by various arithmetic operations.

The RAM 82 functions as a readable and rewritable work memory that stores temporary the arithmetic operations results in the CPU 81.

The ROM 83 is used to store a program or the like for operating the CPU 81.

The data I/O circuit 84 is used to obtain information on a vehicle and various systems of a vehicle (various detection signals such as a vehicle speed and an engine speed), based on data communication specification between interconnected devices called a controller area network (CAN).

The A/D converter 85 converts an analog voltage outputted from the light sensor 70 to a digital value (luminance detection value), and outputs it to the CPU 81.

The drive circuit 86 outputs a drive current to the display 20 according to a control signal from the CPU 81, and changes display contents of the display 20, or adjusts the brightness of the display light L.

Figure 3:
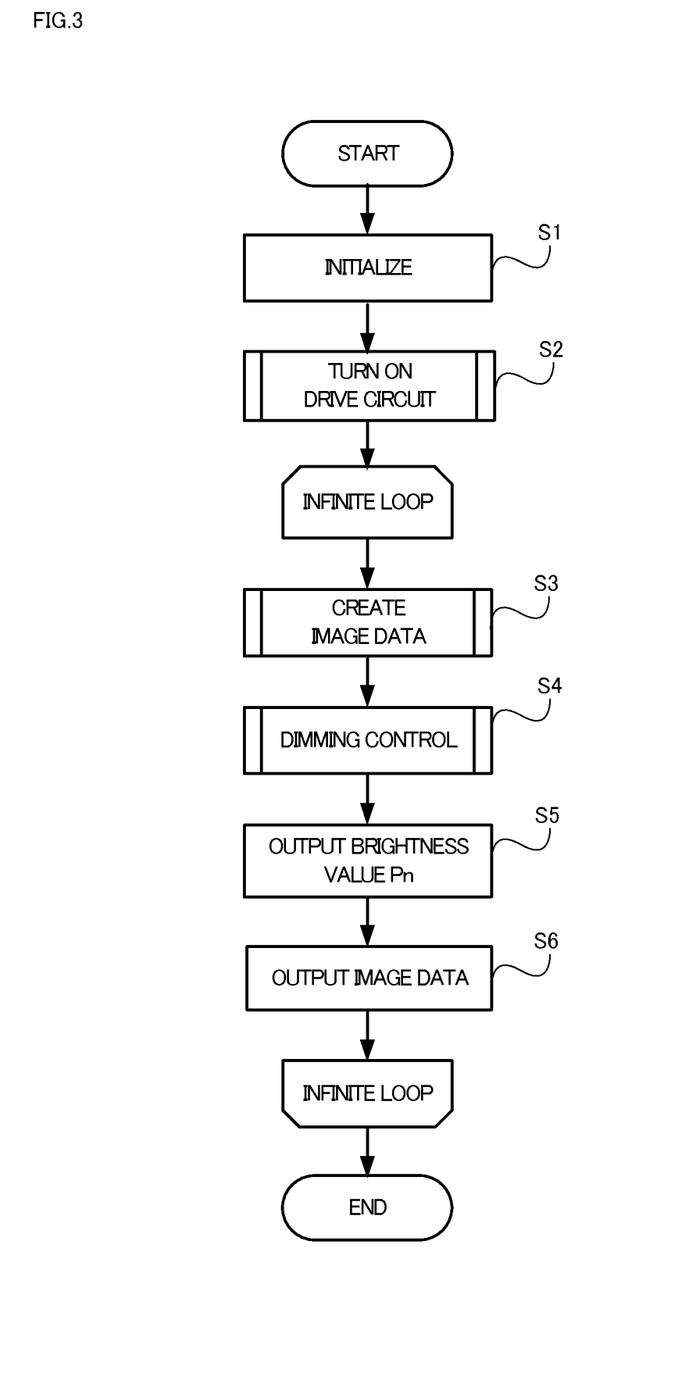
FIG. 3 is a flowchart showing a control method of the HUD device.
Figure 4:
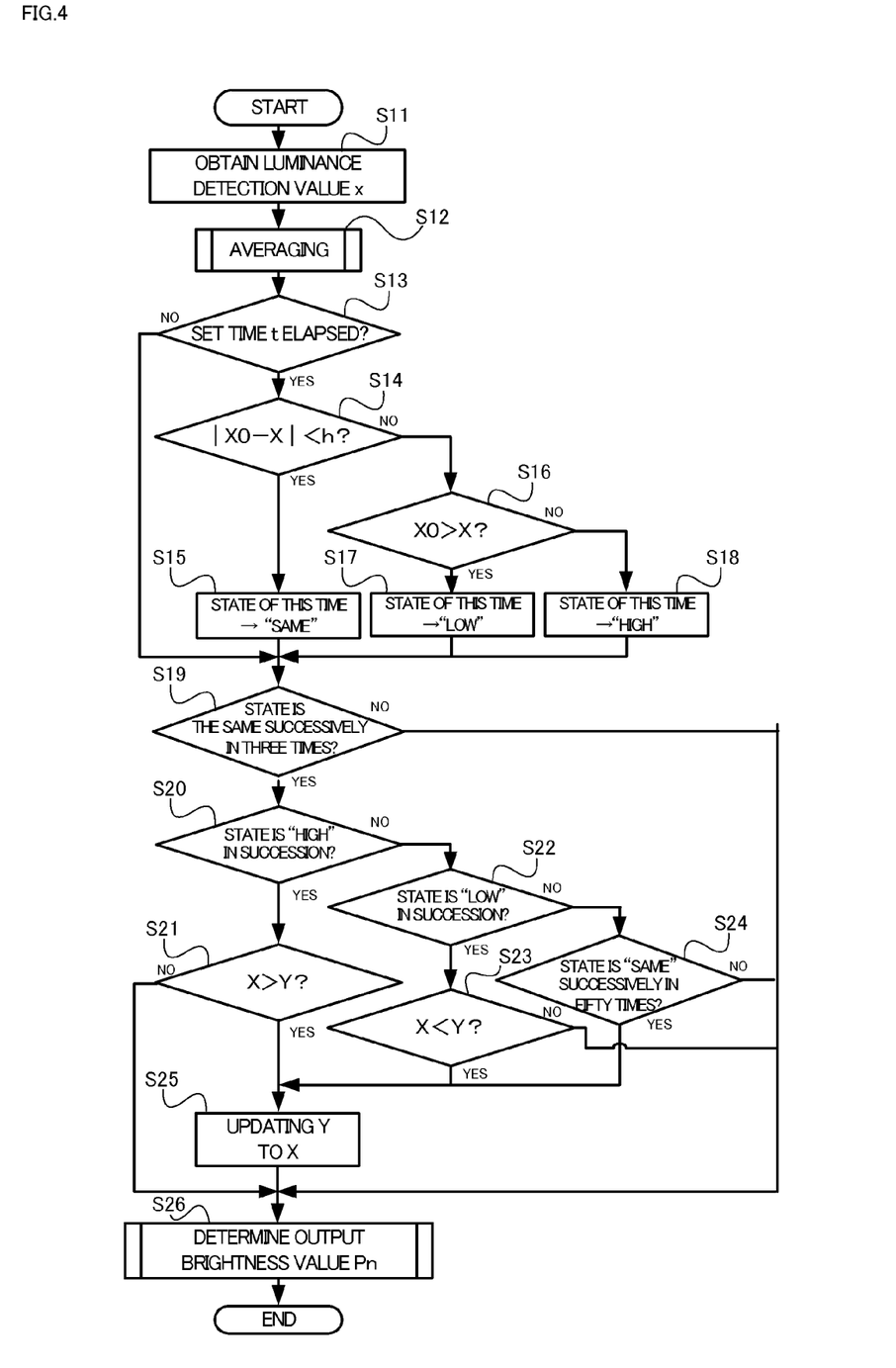
FIG. 4 is a flowchart showing a dimming control method of the HUD device.

Next, a control method of the HUD device 1 will be explained with reference to FIG. 3 and FIG. 4. First, FIG. 3 shows a flowchart of the entire display control process of the HUD device 1.

First, in step S1, the CPU 81 initializes various functions, when the microcomputer is turned on by connection of a battery line of a vehicle.

Next, in step S2, the CPU 81 supplies power to the drive circuit 86.

Next, in step S3, the CPU 81 receives the vehicle information from a vehicle via the data I/O circuit 84, and creates display image data to be displayed on the display 20 based on the vehicle information.

Next, in step S4, the CPU 81 determines an output brightness value Pn of this time by a dimming control described later.

Next, in step S5, the CPU 81 outputs the output brightness value Pn of this time that is determined in step S4. Based on the output brightness value Pn, the drive circuit 86 controls the display 20 by pulse width modulation (PWM), for example, and adjusts the brightness of the display light L.

Next, in step S6, the CPU 81 outputs the display image data created in step S3 to the drive circuit 86. The drive circuit 86 changes the display contents of the display 20 based on the display image data, and displays an arbitrary display image.

The CPU 81 repeats the processing of steps S3 to S6 until the power supply is stopped.

Next, the dimming control in step S4 will be explained in detail with reference to FIG. 4.

First, in step S11, the CPU 81 obtains a luminance detection value x indicating the luminance of the external light N from the light sensor 70 via the A/D converter 85. The RAM 82 holds the luminance detection value x of this time and past three times, the values of total four times.

Next, in step S12, the CPU 81 performs simple moving average processing for the luminance detection values of four times, including this time, and calculates an average luminance value X of this time. The number of sampling is four times in the embodiment, but the number of sampling is optional.

Next, in step S13, the CPU 81 determines whether or not the time t (for example, 300 msec) set by a timer has elapsed after the last determination of luminance change (described later). When the set time t has elapsed (step S13: Yes), the CPU goes to step S14. When the set time t has not elapsed (step S13: No), the CPU goes to step S19.

In step S14, the CPU 81 determines whether or not an absolute value of a difference between an average luminance value X0 in the last determination (that is, before the set time t) stored in the RAM 82 and an average luminance value X of this time is smaller than a threshold value h. When the absolute value of the difference therebetween is smaller than the threshold value h (|X0−X|<h, step S14: Yes), the CPU determines that there is no luminance change, and goes to step S15. When the difference between them is greater than the threshold value h(|X0−X|≥h, step S14: No), the CPU determines that there is a luminance change, and goes to step S16.

In step S15, the CPU 81 determines the type of the determination of a luminance change of this time in step S14 to be "Same" indicating a state that there is no change in ambient luminance (no luminance change), and goes to step S19.

In step S16, the CPU 81 determines whether or not the average luminance value X0 in the last determination is greater than the average luminance value X of this time. When the average luminance value X0 in the last determination is greater than the average luminance value X of this time (X0 > X, step S16: Yes), the CPU goes to step S17. When the average luminance value X0 in the last determination is smaller than the average luminance value X of this time (X0<X, step S16: No), the CPU goes to step S18.

In step S17, the CPU 81 determines the type of the state of the determination result of a luminance change of this time in step S14 to be "Low" indicating a state that ambient luminance is decreased (luminance decrease), and goes to step S19.

In step S18, the CPU 81 determines the type of the state of the determination result of a luminance change of this time in step S14 to be "High" indicating a state that ambient luminance is increased (luminance increase), and goes to step S19.

In step S19, the CPU 81 determines whether the state of the determination results of a luminance change in three times, including this time is continuously the same type (any one of "Same", "Same", "Same"; "Low", "Low", "Low"; and "High", "High", "High"). When the state is the same in three consecutive times (step S19: Yes), the CPU goes to step S20. When the same state does not continue three times (step S19: No), the CPU goes to step S26. When the same state continues three times or more, it is included in the case that the same state continues three times.

In step S20, the CPU 81 determines whether or not the type of the state of the determination of an illumination change in three consecutive times is "High". When the type of the state is "High" (step S20: Yes), the CPU goes to step S21. When the type of the state is not "High" (step S20: No), the CPU goes to step S22.

In step D21, the CPU 81 determines whether or not the average luminance value X of this time is greater than a target reference value Y that is currently set. When the average luminance value X of this time is greater than the target reference value Y (Sep S21: Yes), the CPU goes to step S25. When the average luminance value X of this time is smaller than the target reference value Y (Sep S21: No), the CPU goes to step S26.

In step S22, the CPU 81 determines whether or not the type of the state of the determination result of a luminance change in three consecutive times is "Low". When the type of the state is "Low" (step S22: Yes), the CPU goes to step S23. When the type of the state is not "Low" (step S22: No), the CPU goes to step S24.

In step S23, the CPU 81 determines whether or not the average luminance value X of this time is smaller than the target reference value Y that is currently set. When the average luminance value X of this time is smaller than the target reference value Y (step S23: Yes), the CPU goes to step S25. When the average luminance value X of this time is greater than the target reference value Y (Sep S23: No), the CPU goes to step S26.

In step S24, the CPU 81 determines whether the state of the determination result of a luminance change in fifty times, including this time is continuously "Same". When the state is "Same" in fifty consecutive times (step S24: Yes), the CPU goes to step S25. When the state is not "Same" in fifty consecutive times (step S24: No), the CPU goes to step S26. When the same state continues fifty times or more, it is included in the case that the same state continues fifty times.

In step S25, the CPU 81 updates the target reference value Y, and sets the average luminance value X of this time as a new target reference value Y. Then, the CPU 81 goes to step S26.

In step S26, the CPU 81 reads a target luminance value Pt corresponding to the target reference value Y being set, and calculates an output luminance value Pn based on the target luminance value Pt.

In particular, first, the CPU 81 refers to a data table stored in the ROM 83, that consists of multiple target reference values Y and multiple target luminance values Pt corresponding to the target reference values Y, and determines a target luminance value Pt corresponding to the target reference value Y being set. Correspondence between the target reference value Y and the target luminance value Pt in this data table is determined so that the target luminance value Pt becomes the target reference value Y, that is, a value that the viewer 2 easily recognizes a display image (virtual image V) relative to ambient luminance.

The CPU 81 calculates the output luminance value Pn of this time so as to approach at a constant rate with respect to the target luminance value Pt that is determined from the output of last time. In particular, the output luminance value Pn of this time is obtained by the equation Pn=Po+(Pt−Po)/a (a is a coefficient). The equation calculates an increase of a luminance value by dividing a difference between the target luminance value Pt and the output luminance value Po of last time by a coefficient a, and obtains the output luminance value Pn of this time by adding the increase to the output luminance value Po of last time. The reason of calculating the output luminance value Pn of this time in such a manner is that the viewer 2 is disturbed by a sudden brightness change that occurs when changing the output luminance value Po of last time directly to the target luminance value Pt. The coefficient a may not be always constant, and may be different in the cases of increasing and decreasing the display brightness. Generally, light adaptation requires shorter time than dark adaptation. Thus, it is possible to achieve a brightness control adapted to the characteristics of the human eye by shortening the time to reach the target luminance value Pt by decreasing the value of the coefficient a in the case of increasing the display brightness, and by lengthening the time to reach the target luminance value Pt by increasing the value of the coefficient a in the case of decreasing the display brightness.

By executing the above process, the CPU 81 determines a luminance change every set time t. When the state of the determination result of a luminance change is "High" in three consecutive times, in a duration before the next determination (namely, before the set time t elapses, step S13: No), the CPU updates the target reference value Y to the average luminance value X of this time, only when the average luminance value X of this time is greater than the target reference value Y, and adjusts the display brightness based on the target reference value Y (namely, the average luminance value X of this time). The calculation of the average luminance value X is done in a cycle shorter than the set time t (for example, 100 msec) to meet a display image update cycle. When the state of the determination result of a luminance change is "Low" in three consecutive times, the CPU updates the target reference value Y to the average luminance value X of this time, only when the average luminance value X of this time is smaller than the target reference value Y, and adjusts the display brightness based on the target reference value Y (namely, the average luminance value X of this time). When the state of the determination result of a luminance change is "Same" in fifty consecutive times, the CPU updates the target reference value Y to the average luminance value X of this time, and adjusts the display brightness based on the target reference value Y (namely, the average luminance value X of this time). In the other cases than the above, the target reference value Y is not updated, and the display brightness is adjusted based on the target reference value Y (namely, not the average luminance value X of this time, but a previous average luminance value). In this case, when the output luminance value Po of last time does not reach the target luminance value Pt, the display brightness is continuously adjusted so as to approach the target luminance value Pt. In the case that the output luminance value Po of last time has already reached the target luminance value Pt, the display brightness is maintained.

In the HUD device 1 and the control method, that is, the embodiment, the CPU 81 of the control means 80 determines that there is no change in luminance, when an absolute value of a difference between an average luminance value X of this time (a luminance value of this time) calculated based on the detection result (luminance detection value x) of the light sensor 70 and an average luminance value X0 in the last determination (a luminance value in the last determination) is less than a predetermined threshold value h (|X0−X|<h, step S14: Yes); determines that there is a change, when the absolute value of the difference between the average luminance value X of this time and the average luminance value X0 in the last determination is equal to or greater than the threshold value h(|X0−X|≥h, step S14: No); and adjusts the display brightness of the display 20 in accordance with the average luminance value X of this time, when it is determined that there is a change in luminance successively in three times (a first number of times) (steps S25 and S26).

Thus, even when a small variation of the luminance detection value x continues, it is possible to exclude such a change due to a small variation from a determination that there is a change in illumination, by the threshold value h, and to reduce a display flicker due to a change in display brightness without decreasing responsiveness to adjustment of display brightness.

Further, in the HUD device 1 and the control method, that is, the embodiment, the CPU 81 of the control means 80 adjusts the display brightness of the display 20 in accordance with the average luminance value X of this time (steps S25 and S26), when it is determined that there is no illumination changes in 50 consecutive times (the second number of times) (steps S24; Yes). Thus, even when a luminance change gradually occurs within the range of the threshold value h and the actual ambient luminance does not comply with the display brightness, it is possible to modify the display brightness suitable for the actual luminance in a constant cycle (every time required to perform 50 times of determination in this embodiment). In this case, when the modification cycle is short, a display flicker may occur. Thus, it is desirable to set the modification cycle relatively long.

Further, in the HUD device 1 and the control method, that is, the embodiment, the CPU 81 of the control means 80 calculates the average luminance value X in a cycle shorter than a cycle (set time t) to determine an illumination change, determines whether the state of the determination result of the luminance change is any one of no luminance change ("Same"), luminance increase ("High"), and luminance decrease ("Low") (steps S14 to S18). While it is being determined that there is a luminance change successively three times, the CPU adjusts the display brightness of the display 20 in accordance with the average luminance value X of this time (steps S25 and S26), only when the state of the change in the average luminance value X (the large and small of the average luminance value X with respect to the target reference value Y) coincides with the state of the determination result of a luminance change (X>Y when the state of the determination result of a consecutive luminance change is "High", and X<Y when the state is "Low", steps S20 to S23).

Conventionally, while it is being determined that the luminance change occurs continuously three times, when the display brightness of the display 20 is adjusted in accordance with the average luminance value X of this time calculated during the determination (the average luminance value X of this time updated to the target reference value Y), the output luminance value Pn is unstable in the case that there is a variation in the average luminance value X, and a display flicker may occur. On the contrary, by doing as described above, even when the average luminance value X changes different from the state of the determination result of a luminance change, the average luminance value X is not employed as a reference for adjustment of display brightness (not updated to the target reference value Y), it is possible to stabilize the output brightness value Pn during the determination of a luminance change, and a display flicker is suppressed.

The above description is to be understood to illustrate the present invention. It will be appreciated that various modifications and alternations might be made without departing from the spirit of the invention. The embodiment is the HUD device 1 that enables the viewer 2 to recognize a virtual image V of a display image. The invention may be applied to a direct-view type display device that a viewer directly views a display image. The invention is effective, particularly for a display device for a vehicle that a luminance changes extremely around a display image. However, the invention may be applied to any display device other than that for a vehicle as long as it is assumed to be used in an environment where ambient illumination changes.

INDUSTRIAL APPLICABILITY

The present invention can be applied to a display device capable of adjusting a display brightness of a light-emitting display in accordance with ambient luminance, and a control method for the same.

DESCRIPTION OF REFERENCE NUMERALS

1 HUD device (Display device)
2 Viewer
10 Case body
20 Display (Light-emitting display)
30 Circuit board
40 Reflection member
50 Combiner
60 Light guide body
70 Light sensor (luminance detection means)
80 Control means
81 CPU
82 RAM
83 ROM
84 Data I/O circuit
85 A/D converter
86 Drive circuit
L Display light
N External light
V Virtual image

What is claimed is:

1. A display device comprising
   a light-emitting display capable of changing display brightness,
   a luminance detection means that detects ambient luminance, and
   a control means that controls the display brightness of the light-emitting display in accordance with a luminance value calculated based on the detection result of the luminance detection means, wherein:
   the control means is configured to:
      determine that there is no luminance change when an absolute value of a difference between a luminance value of this time and a luminance value in the last determination is less than a predetermined threshold value,
      determine that there is a luminance change when an absolute value of a difference between the luminance value of this time and the luminance value in the last determination is equal to or greater than the predetermined threshold value, and
      adjust the display brightness of the light-emitting display in accordance with the luminance value of this time, when it is determined that there is a luminance change successively in a first number of times.

2. The display device according to claim 1, wherein
   the control means adjusts the display brightness of the light-emitting display in accordance with the luminance value of this time, when it is determined that there is no luminance change successively in a second number of times more than the first number of times.

3. The display device according to claim 1, wherein:
   the control means is configured to:
   calculate the luminance value in a cycle shorter than a cycle to determine a luminance change,
   determine whether a state of the determination result of a luminance change is no luminance change, luminance increase, or luminance decrease, and adjust the display brightness of the light-emitting display in accordance with the luminance value of this time, only when the state of the change in the luminance value coincides with the state of the determination result of the luminance change, while it is being determined that there is a luminance change successively in the first number of times.

4. A control method for a display device, that comprises a light-emitting display capable of changing display brightness, and a luminance detection means that detects ambient luminance, and controls display brightness of the light-emitting display in accordance with a luminance value calculated based on the detection result of the luminance detection means, the method comprising:

determining that there is no luminance change when an absolute value of a difference between a luminance value of this time and a luminance value in the last determination is less than a predetermined threshold value, determining that there is a luminance change when an absolute value of a difference between the luminance value of this time and the luminance value in the last determination is equal to or greater than the predetermined threshold value, and adjusting the display brightness of the light-emitting display in accordance with the luminance value of this time, when it is determined that there is a luminance change successively in a first number of times.

5. The control method for the display device according to claim 4, the method comprising:

adjusting the display brightness of the light-emitting display in accordance with the luminance value of this time, when it is determined that there is no luminance change successively in a second number of times more than the first number of times.

6. The control method for the display device according to claim 4, the method comprising:

calculating the luminance value in a cycle shorter than a cycle to determine a luminance change, determining whether a state of the determination result of luminance change is no luminance change, luminance increase, or luminance decrease, and adjusting the display brightness of the light-emitting display in accordance with the luminance value of this time, only when the state of the change in the luminance value coincides with the state of the determination result of the luminance change, while it is being determined that there is a luminance change successively in the first number of times.

* * * * *